United States Patent [19]

Longman

[11] Patent Number: 4,980,944
[45] Date of Patent: Jan. 1, 1991

[54] UNIVERSAL WIPER BLADE PIN CONNECTOR

[75] Inventor: Rodney K. Longman, Boca Raton, Fla.

[73] Assignee: Pylon Manufacturing Corporation, Deerfield Beach, Fla.

[21] Appl. No.: 379,392

[22] Filed: Jul. 13, 1989

[51] Int. Cl.$^5$ ............................................. B60S 1/40
[52] U.S. Cl. ................................. 15/250.32; 403/163
[58] Field of Search ............ 15/250.31, 250.32, 250.33, 15/250.34, 250.42; 16/38, 43; 81/DIG. 11; 403/3, 152, 163

[56] References Cited

U.S. PATENT DOCUMENTS

| | | | |
|---|---|---|---|
| 498,444 | 5/1893 | McElhiney | 16/38 |
| 702,337 | 8/1902 | Nickel et al. | 16/38 |
| 1,665,882 | 4/1928 | Jarvis et al. | 16/43 |
| 3,166,781 | 1/1965 | Schultz, Jr. | 16/43 |
| 3,588,941 | 6/1971 | Schlesinger . | |
| 3,588,942 | 6/1971 | Schlesinger . | |
| 3,866,259 | 2/1975 | Nichols et al. . | |
| 3,875,611 | 4/1975 | Plisky et al. . | |
| 3,883,919 | 5/1975 | Harbison et al. . | |
| 3,935,612 | 2/1976 | Wittwer . | |
| 4,144,613 | 3/1979 | Wubbe . | |
| 4,177,537 | 12/1979 | Roadarmel . | |
| 4,195,382 | 4/1980 | Macpherson . | |
| 4,214,343 | 7/1980 | Dudek . | |
| 4,224,001 | 9/1980 | Arndt et al. . | |
| 4,240,177 | 12/1980 | Harbison et al. . | |
| 4,244,077 | 1/1981 | Harbison et al. . | |
| 4,296,520 | 10/1981 | Arndt . | |
| 4,296,521 | 10/1981 | Mower | 15/250.32 |
| 4,324,019 | 4/1982 | Mohnach et al. . | |
| 4,347,640 | 9/1982 | Durtnal | 15/250.32 |
| 4,354,293 | 10/1982 | Le Sausse et al. | 15/250.32 |
| 4,358,869 | 11/1982 | Frankus . | |
| 4,443,907 | 4/1984 | Chamberlain . | |
| 4,445,249 | 5/1984 | Harbison et al. . | |
| 4,446,589 | 5/1984 | Maiocco | 15/250.32 |
| 4,477,940 | 10/1984 | Will . | |
| 4,649,591 | 3/1987 | Guerard . | |

FOREIGN PATENT DOCUMENTS

| | | | |
|---|---|---|---|
| 611563 | 6/1979 | Canada | 15/250.32 |
| 2035065 | 6/1980 | United Kingdom | 15/250.32 |

Primary Examiner—Harvey C. Hornsby
Assistant Examiner—Joseph S. Machuga
Attorney, Agent, or Firm—Edgar A. Zarins; Malcolm L. Sutherland

[57] ABSTRACT

An adaptor for a windshield wiper blade to allow the wiper superstructure to be mounted to different diameter pin connectors associated with a wiper arm. Typically, wiper arms are provided with a side pin having either of two diameters. The adaptor bushing of the present invention allows a single wiper blade to be used with either pin type. The wiper blade includes laterally aligned apertures and a retainer spring clip to prevent inadvertent removal of the blade. With a larger diameter pin, the pin is simply placed through the aperture to engage the spring. With the smaller diameter pin the adapter bushing is positioned within the apertures to receive the pin. The adaptor has an offset throughbore such that when the pin is positioned within the adaptor, the spring clip will prevent withdrawal of the pin until the spring is released. The adaptor allows a supplier to stock a single style of replacement blade which can be mounted to either pin connector.

11 Claims, 2 Drawing Sheets

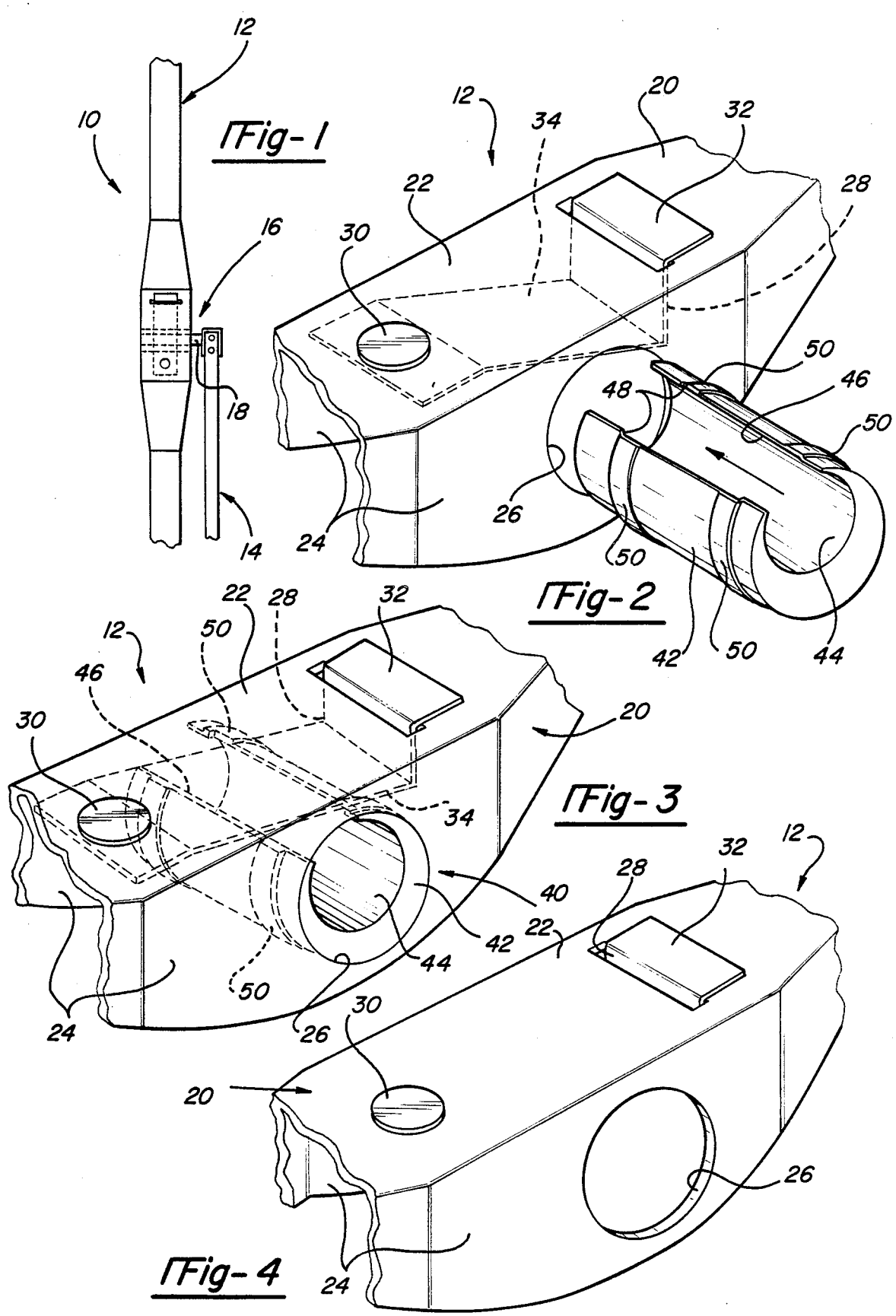

UNIVERSAL WIPER BLADE PIN CONNECTOR

BACKGROUND OF THE INVENTION

I. Field of the Invention

This invention relates to connectors for attaching wiper blades to the wiper arm of a vehicle and, in particular, to an adaptor for a pin-type connector of a wiper arm which allows a wiper blade to be attached to wiper arms having different diameter pins.

II. Description of the Prior Art

Many different connectors have been designed for attaching a windshield wiper blade to a wiper arm associated with a vehicle. The connector must securely retain the blade in the proper position while allowing simple removal and replacement. One popular method is the side pin connector which incorporates a lateral pin into the wiper arm. The pin is received through a pair of aligned apertures formed in the channel-shaped body of the wiper blade superstructure. The channel is provided with a releasable spring clip which engages a recessed portion of the pin to prevent inadvertent withdrawal of the pin from the blade. When the blade needs to be detached from the arm, the retainer spring clip is disengaged from the recessed portion of the pin to permit withdrawal of the pin.

In an attempt to prevent a vehicle owner from using the wiper blades of other manufacturers, wiper blades and arms having different aperture and pin sizes have been developed. Historically, the connector pin has been manufactured in one diameter. Recently, however, a larger diameter connector pin has been introduced into the market. The smaller apertures will not accept the larger pin and therefore automotive suppliers must stock all lengths of windshield wiper blades for each of the different pin sizes. Space and cost consideration may prohibit some suppliers from stocking the full range of wipers needed to service all customers. Moreover, manufacturing costs could be greatly reduced by making only one type of blade superstructure which could be fitted to the different connectors.

SUMMARY OF THE PRESENT INVENTION

The present invention overcomes the disadvantages of the prior known wiper systems by providing an adaptor which allows attachment of a wiper blade to either size pin connector.

The universal wiper blade pin connector according to the present invention generally comprises a wiper blade superstructure having a pair of aligned apertures formed in a channel-shaped body. The apertures are large enough to receive the largest manufactured connector pin. A retainer spring clip mounted within the structure engages the pin to prevent withdrawal of the pin. The clip must be disengaged from the pin in order to withdraw the pin and detach the wiper blade from the arm. An adaptor bushing is provided with the blade to attach the wiper to a wiper arm having a smaller pin connector. The adaptor has a diameter substantially equal to the diameter of the apertures in the wiper blade structure in order to fit therein. The adaptor has a throughbore with a diameter substantially equal to the diameter of the smaller pin connector. The bore is offset from the axis of the adaptor such that a portion of the outer wall of the adaptor is removed. The exposed throughbore allows the spring clip to engage and retain the connector pin. Annular shoulders on the adaptor prevent withdrawal of the adaptor upon engagement by the spring clip.

Thus, the simple adaptor of the present invention may be included with a replacement wiper blade to provide a universal windshield wiper blade adaptable to the different side pin arms. This eliminates the need to manufacture and stock two different styles of windshield wiper blades resulting in a reduction in cost without a reduction in performance.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views, and in which:

FIG. 1 is a top plan view of a wiper blade and wiper arm assembly embodying the present invention;

FIG. 2 is an enlarged perspective of the wiper blade with the adaptor embodying the present invention being inserted therein;

FIG. 3 is an enlarged perspective of the wiper blade with the adaptor positioned within the apertures;

FIG. 4 is an enlarged perspective of the wiper blade without the adaptor;

DETAILED DESCRIPTION OF A PREFERRED EMBODIMENT OF THE PRESENT INVENTION

Figure 5:
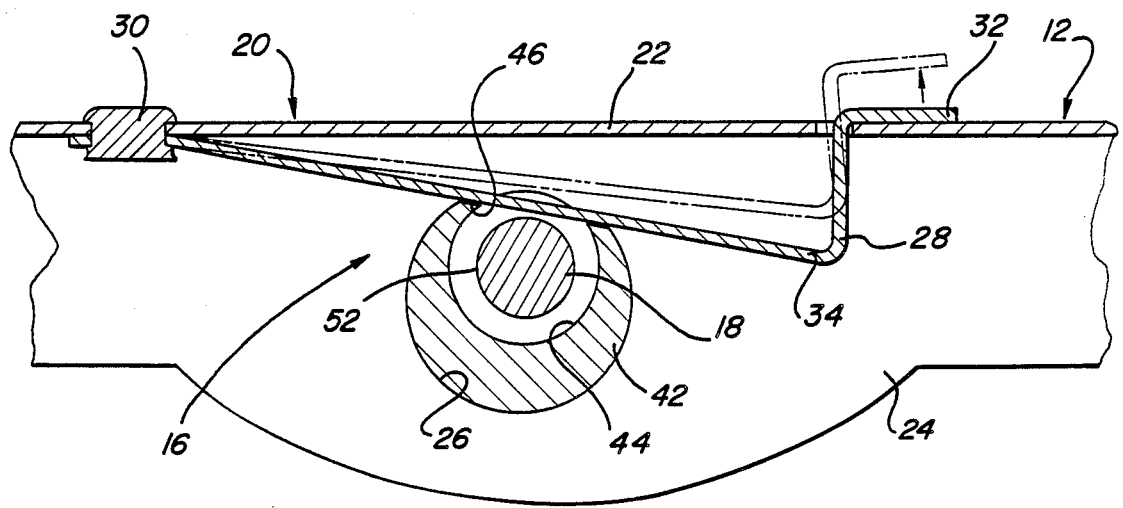
FIG. 5 is a cross-sectional view of the wiper blade with the adaptor positioned within the aperture thereof and a smaller pin connector extending through the adaptor.

Referring first to FIG. 1, there is shown a wiper assembly 10 of the type used on motor vehicles and embodying the present invention. The wiper assembly 10 generally comprises a wiper blade 12 having a wiping element and a wiper arm 14 connected to the vehicle. The wiper arm 14 includes a side pin connection assembly 16 for pivotably mounting the wiper blade 12 to the wiper arm 14. The connection assembly 16 is such that the blade 12 can be replaceably removed from the arm 14 when the wiping element has become worn yet the blade 12 is securely connected to the arm 14 to prevent inadvertent detachment during operation. The connection assembly 16 of the present invention allows universal adaptation of the wiper arm 14 to different types of wiper blades 12 as will be subsequently described. The connection assembly 16 preferably includes a connector pin 18 laterally extending from the end of the wiper arm 14 and received by the wiper blade 12.

Figure 6:
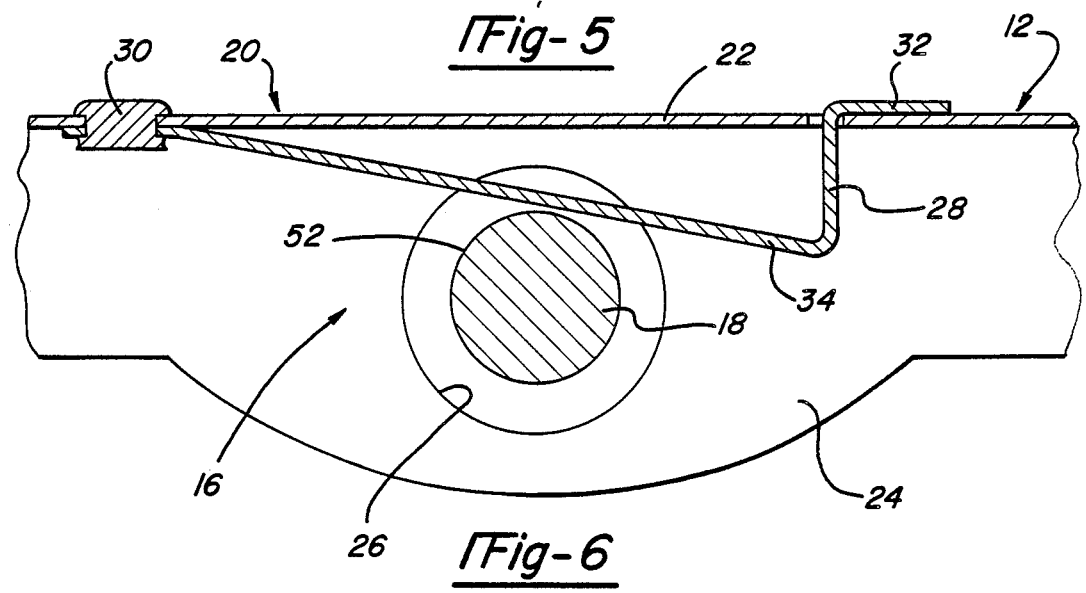
FIG. 6 is a cross-sectional view of the wiper blade with a larger pin connector extending through the apertures thereof.

Referring now to FIGS. 2 through 6, the wiper blade 12 includes a superstructure with at least one support member 20 to which the wiping element is connected. In a preferred embodiment, the support member 20 is channel-shaped with an upper wall 22 and pair of spaced-apart side walls 24. Formed in the side walls 24 are a pair of aligned apertures 26 for receiving the connector pin 18 of the wiper arm 14. Since the connector pins 18 are manufactured in a variety of diameters, the aligned apertures 26 are preferably manufactured with a diameter substantially equal to the largest pin connector 18 manufactured such that the large pin 18 can be extended into the apertures 16. Mounted within the channel support 20 between the aligned apertures 26 is a retainer spring clip 28. In a preferred embodiment, the clip 28 is mounted to the top wall 22 by a rivet 30 or the like and includes lift tab 32 for manual engagement by the user for assembly and disassembly. A downwardly extending portion 34 of the clip 28 engages the connector pin 18 to prevent withdrawal thereof as will be subsequently described and can be lifted out of contact with the pin 18 by lifting the tab 32.

Although the aligned apertures 26 will receive and retain a pin 18 having a diameter substantially equal to the diameter of the apertures 26 (FIG. 6), smaller diameter pins 18 will have too much free play to adequately retain the wiper blade 12. For smaller diameter connector pins 18, an adaptor 40 embodying the present invention is utilized in conjunction with the apertures 26 of the wiper blade 12. The adaptor 40 of the present invention comprises a substantially cylindrical bushing 42 which has an outer diameter substantially equal to the diameter of the apertures 26 to be received therein. The bushing 42 includes a longitudinal throughbore 44 extending parallel to the axis of the bushing 42 but offset from the axis in such a manner as to create a longitudinal split 46 in the wall of the bushing 42. The split 46 is adapted to receive the spring clip 28 to prevent removal of the bushing 42. The split 46 is provided with cooperating shoulders 48 between which the clip 28 seats thereby preventing movement of the clip 28. Additionally, bands 50 on the outer surface of the bushing 42 provide a larger diameter than the apertures 26 thereby forming annular shoulders which engage the inner surface of the side walls 24 to restrict displacement of the bushing 42 when not engaged by the clip 28. The bushing 42 can be removed from the apertures 26 by squeezing the bushing 42 to narrow the split 46 to provide the necessary clearance for removal as will be described herein below.

The throughbore 44 of the bushing 42 has a diameter substantially equal to the diameter of the small connector pin 18 in order to matingly receive the pin 18. The connector pins 18 are provided with an annular recess 52 which receives the pin 18 to selectively prevent withdrawal of the pin 18 from the channel support 20 until the clip 28 is disengaged from the pin 18. In the case of the smaller diameter pin 18 which utilizes the adaptor bushing 42, the retainer clip 28 not only seats within the recess 52 of the pin 18 but also the shoulders 48 of the bushing 42. Thus, both the adaptor 40 and the pin 18 are prevented from being withdrawn until the spring clip 28 is lifted from the recesses. An adaptor 40, with different diameter throughbore, can be manufactured for any size pin 18 for use with a standard wiper blade refill 12.

Thus, the present invention provides a convenient and inexpensive method of allowing a replacement wiper blade 12 to be attached to any size side pin connector 16 of a wiper arm 14. With the larger pin connector 18 having a diameter substantially equal to the aligned apertures 26, no adaptor is necessary and the wiper blade 12 is attached to the arm 14 by threading the pin 18 through the aligned apertures 26 until the clip 28 comes to rest in the recess of the pin 18. A tapered end on the pin 18 will push the spring clip 18 aside to permit the pin to extend through the apertures 26. In the event the wiper arm 18 is provided with a smaller diameter pin 18 than the apertures 26, the adaptor 40 may be used. The bushing 42 is first placed within the aligned apertures 26 by squeezing the bushing 42 to provide the necessary clearance between the edges of the apertures 26 and the shoulders 50. Simultaneously the bushing 42 is positioned such that the clip 28 extends across the split 46. In this position, the clip 28 will cooperate with the shoulders 46 to prevent inadvertent removal of the bushing 42. With the bushing 42 positioned, the pin 18 can be fed through the offset bore 44 until the clip 28 engages the recess 52 on the pin 18. Consequently, both the pin 18 and the bushing 42 are retained by the spring clip 28.

The foregoing detailed description has been given for clearness of understanding only and no unnecessary limitations should be understood therefrom as some modifications will be obvious to those skilled in the art without departing from the scope and spirit of the appended claims.

I claim:

1. An adaptor for connecting a windshield wiper blade to a wiper arm associated with a vehicle, the wiper arm including a pin connector having a first predetermined diameter and the wiper blade including at least one channel support having a pair of aligned apertures formed in opposite side walls thereof and retaining means mounted to the channel support, the apertures having a predetermined diameter greater than the first diameter of the pin connector, said adaptor comprising:

a substantially cylindrical bushing having an outer diameter substantially equal to the diameter of the aligned apertures, said bushing received within the apertures and engaging the retaining means, said bushing including a longitudinal throughbore having a diameter substantially equal to the first diameter of the pin connector and an opening in the outer wall the pin connector received within said throughbore of said bushing such that the retaining means engages the pin connector through said opening and said bushing to secure the wiper blade to the wiper arm.

2. The adaptor as defined in claim 1 wherein said bushing includes at least one annular shoulder formed on the outer surface thereof, the retaining means engaging said at least one shoulder to retard withdrawal of said bushing from the aligned apertures.

3. The adaptor as defined in claim 1 wherein said throughbore of said bushing is offset form the longitudinal axis of said bushing such that a portion of the outer wall of said bushing is removed forming said opening whereby the retaining means extends into said removed portion of said bushing to engage the pin connector positioned within said throughbore retarding withdrawal of the pin therefrom.

4. The adaptor as defined in claim 3 wherein said bushing is removably received within the apertures of the channel support such that said bushing may be removed from the aligned aperture for connection of the wiper blade to a wiper arm pin connector having a second predetermined diameter equal to the diameter of the aligned apertures, the retaining means engaging the pin connector to retard withdrawal upon insertion of the pin connector into the aligned apertures.

5. The adaptor as defined in claim 4 wherein the pin connector includes an annular recess, the retaining means seating within said recess to selectively prevent withdrawal of the pin connector.

6. The adaptor as defined in claim 5 wherein the retaining means comprises a retaining spring clip mounted to the channel support for selective engagement with said bushing and pin connector.

7. An adaptor for connecting a windshield wiper blade to a wiper arm associated with a vehicle, the wiper arm including a side pin connector having a first predetermined diameter and the wiper blade including a channel-shaped support having opposed side walls with aligned apertures formed therein and retaining means mounted within the support intermediate the side walls of the support, the aligned apertures having a predetermined diameter greater than the first diameter of the pin connector, said adaptor comprising:

a substantially cylindrical bushing having an outer diameter substantially equal to the diameter of the aligned apertures, said bushing received within the apertures and engaged by the retaining means to selectively prevent removal of the bushing, said bushing including a longitudinal throughbore offset form the axis to the busing such that a portion of the outer wall of said cylindrical bushing is removed, the pin connector received within said throughbore of said bushing, the retaining means engaging said bushing and the pin connector through said removed portion to secure the wiper blade to the wiper arm.

8. The adaptor as defined in claim 7 wherein said bushing includes at least one annular shoulder formed on the outer surface thereof, the retaining means seating between spaced apart shoulders to selectively prevent withdrawal of said bushing from the aligned apertures.

9. The adaptor as defined in claim 8 wherein the retaining means comprises a retaining spring clip mounted within the channel support for selective engagement with said bushing and pin connector, the retaining spring clip selectively extending into said removed portion of said bushing to engage the pin connector.

10. The adaptor as defined in claim 9 wherein the pin connector includes an annular recess, the retaining clip selectively seating within said recess of the pin while seating between said outer shoulders of said bushing to prevent withdrawal of pin connector from said bushing and wiper blade thereby selectively preventing inadvertent detachment of the wiper blade from the wiper arm.

11. In a wiper assembly for a vehicle, the assembly including a wiper blade having a primary channel-shaped support member having an upper wall, a pair of spaced side walls, the side walls having aligned apertures, and retaining means mounted between the side walls intermediate the aligned apertures, and a wiper arm with side pin connector, the pin connector having a first predetermined diameter and the aligned apertures having a diameter greater than the diameter of the pin connector, an adaptor for connecting the larger diameter apertures of the wiper arm to the smaller diameter pin connector of the wiper arm, said adaptor comprising:

a substantially cylindrical bushing having an outer diameter of the aligned apertures, said bushing received within the apertures and engaged by the retaining means to selectively prevent removal of the bushing, said bushing including a longitudinal throughbore offset from the axis of said bushing such that a portion of the outer wall of said bushing is removed, the throughbore having a diameter substantially equal to the smaller diameter pin connector, the pin connector received within said throughbore, the retaining means seating within an annular recess of the pin connector and between spaced apart shoulders formed on the outer surface of said bushing to selectively prevent withdrawal of the pin connector from said bushing and said bushing from the aligned apertures thereby securing the wiper blade for the wiper arm.

* * * * *